(12) United States Patent
Chen

(10) Patent No.: US 12,711,801 B2
(45) Date of Patent: Aug. 18, 2026

(54) SIGNAL INTEGRATION SYSTEM AND CAPACITIVE TOUCH CONTROL DEVICE

(71) Applicant: PixArt Imaging Inc., Hsin-Chu City (TW)

(72) Inventor: Ching-Shun Chen, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 527 days.

(21) Appl. No.: 17/993,894

(22) Filed: Nov. 24, 2022

(65) Prior Publication Data

US 2024/0177518 A1 May 30, 2024

(51) Int. Cl.

| | |
|---|---|
| ***G06V 40/13*** | (2022.01) |
| ***B60R 16/023*** | (2006.01) |
| ***G06F 3/042*** | (2006.01) |
| ***G06F 3/044*** | (2006.01) |
| ***G06V 40/10*** | (2022.01) |

(52) U.S. Cl.

CPC .......... *G06V 40/1318* (2022.01); *G06F 3/042* (2013.01); *G06F 3/0443* (2019.05); *G06V 40/15* (2022.01); *B60R 16/023* (2013.01); *G06F 2203/04106* (2013.01); *G06F 2203/04108* (2013.01)

(58) Field of Classification Search

CPC .......... G06V 40/12–1394; G06F 3/044–0448; G06F 3/0416–04186

See application file for complete search history.

(56) References Cited

U.S. PATENT DOCUMENTS 8,428,450 B2 * 4/2013 Saxena ............... G06F 3/03547 396/15
9,103,658 B2 * 8/2015 Mu ........................ G01B 11/22
9,927,915 B2 * 3/2018 Frame ................... G06F 3/0421
9,971,922 B2 * 5/2018 Ran ....................... G06F 3/0446
10,162,462 B2 * 12/2018 Shen ..................... G06F 3/0446
12,266,207 B2 * 4/2025 Bok ....................... G06F 3/0412
2010/0315337 A1 * 12/2010 Ferren .................. H03K 17/962 345/158
2012/0320385 A1 * 12/2012 Mu ........................ G01B 11/22 356/624
2013/0004030 A1 * 1/2013 Saxena ............. G06V 40/1324 382/124
2013/0057527 A1 * 3/2013 Tanaka .................. G06F 3/0412 345/207
2013/0269867 A1 * 10/2013 Trott ....................... G06F 3/042 156/60
2015/0360711 A1 * 12/2015 Entenmann ............ B62D 1/046 345/156

(Continued)

*Primary Examiner* — Patrick F Marinelli

(74) *Attorney, Agent, or Firm* — Winston Hsu

(57) ABSTRACT

A signal integration system, comprising: an optical finger navigation (OFN) device, configured to sense images of a finger to generate OFN sensing data; and a capacitive touch control circuit, configured to receive the OFN sensing data, configured to generate first control signals for a capacitive touch sensor, and configured to receive touch sensing data from the capacitive touch sensor; wherein the capacitive touch control circuit integrates the OFN sensing data and a touch sensing result corresponding to the touch sensing data to output integrated data.

12 Claims, 7 Drawing Sheets

(56) References Cited

U.S. PATENT DOCUMENTS

| | | | | |
|---|---|---|---|---|
| 2015/0371794 | A1* | 12/2015 | Duenninger | G06F 1/16<br>345/175 |
| 2016/0117048 | A1* | 4/2016 | Frame | G06F 1/3231<br>345/174 |
| 2016/0196463 | A1* | 7/2016 | Jiang | G06F 3/044<br>348/77 |
| 2016/0292488 | A1* | 10/2016 | Ran | G06F 1/325 |
| 2017/0336910 | A1* | 11/2017 | Han | G06F 3/041661 |
| 2018/0039808 | A1* | 2/2018 | Lo | G06F 1/3231 |
| 2019/0026534 | A1* | 1/2019 | Lin | H04L 9/3231 |
| 2019/0197288 | A1* | 6/2019 | Han | G06V 40/13 |
| 2021/0318782 | A1* | 10/2021 | He | G06F 3/03547 |
| 2022/0197466 | A1* | 6/2022 | Chang | G06F 3/0446 |
| 2024/0177518 | A1* | 5/2024 | Chen | G06F 3/042 |
| 2025/0140016 | A1* | 5/2025 | Han | G06V 40/1365 |

* cited by examiner

SIGNAL INTEGRATION SYSTEM AND CAPACITIVE TOUCH CONTROL DEVICE

BACKGROUND OF THE INVENTION

1. Field of the Invention

The present invention relates to a signal integration system and a capacitive touch control device, and particularly relates to a signal integration system and a capacitive touch control device which can integrate OFN (optical finger navigation) sensing data and touch sensing data.

2. Description of the Prior Art

More and more electronic devices are contained in a car. Therefore, various kinds of signals or data are needed to be transmitted between different electronic devices in the car. However, such condition may cause the design complexity for designing a whole system of a car, since electronic devices following different standards must be integrated.

SUMMARY OF THE INVENTION

One objective of the present invention is to provide a signal integration system which can integrate signals or data following different standards.

Another objective of the present invention is to provide a capacitive touch control device which can integrate signals or data following different standards.

One embodiment of the present invention discloses a signal integration system, comprising: an optical finger navigation (OFN) device, configured to sense images of a finger to generate OFN sensing data; and a capacitive touch control circuit, configured to receive the OFN sensing data, configured to generate first control signals for a capacitive touch sensor, and configured to receive touch sensing data from the capacitive touch sensor; wherein the capacitive touch control circuit integrates the OFN sensing data and a touch sensing result corresponding to the touch sensing data to output integrated data.

Another embodiment of the present invention discloses a capacitive touch control device, comprising: a capacitive touch sensor; an optical finger navigation (OFN) device, configure to sense images of a finger to generate OFN sensing data; and a control circuit, configured to receive the OFN sensing data, configured to generate first control signals for the capacitive touch sensor, and configured to receive touch sensing data from the capacitive touch sensor; wherein the control circuit integrates the OFN sensing data and a touch sensing result corresponding to the touch sensing data to output integrated data.

In view of above-mentioned embodiments, the electronic devices following different standards can be easily integrated by the signal integration system. By this way, the complexity for designing the whole system can be reduced.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Besides, in following embodiments, the signal integration system disclosed by the present invention is used in a car. However, the signal integration system can be used in any other scene, for example, the signal integration system can be used in a conveyance such as an airplane or a ship.

Figure 1:
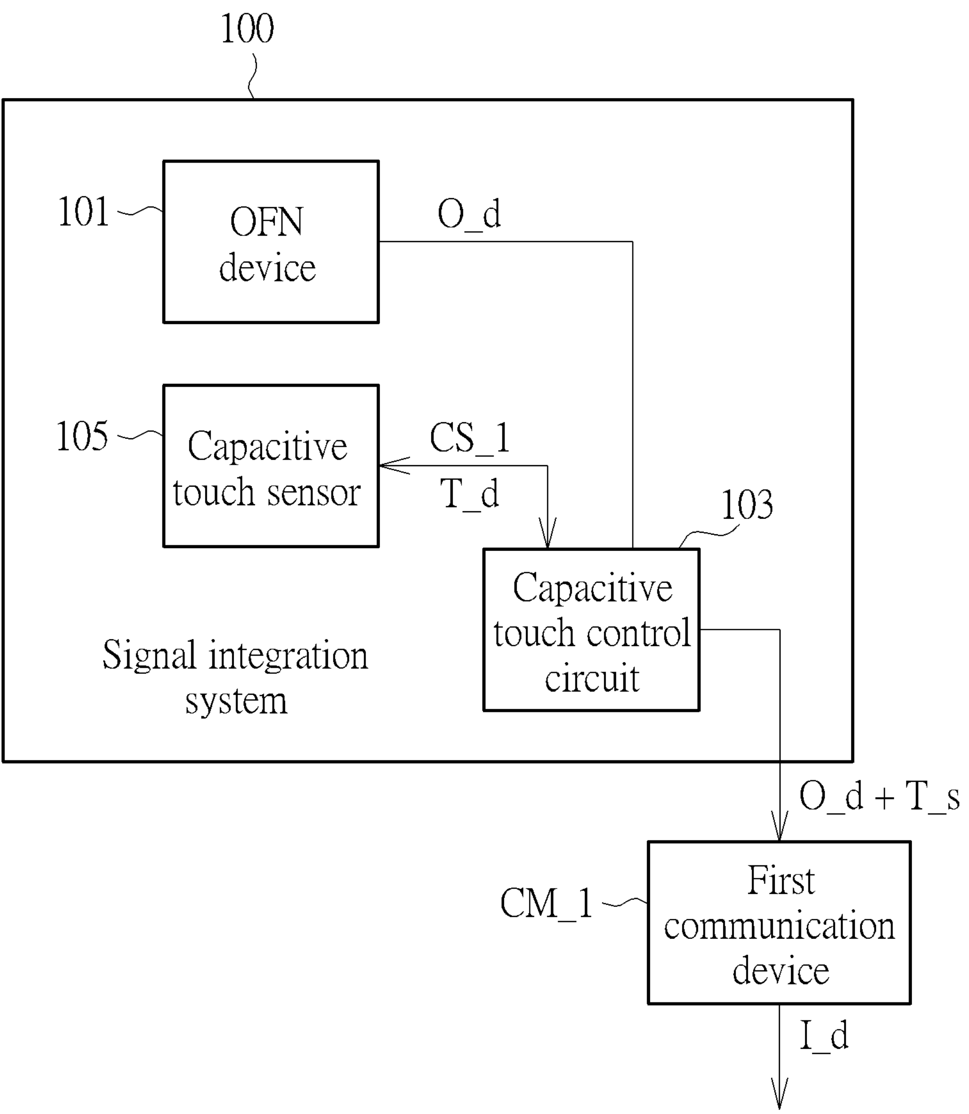
FIG. 1 and FIG. 2 are block diagrams illustrating that the signal integration system provided by the present invention is connected to other electronic devices in a car via different mechanisms.
Figure 2:
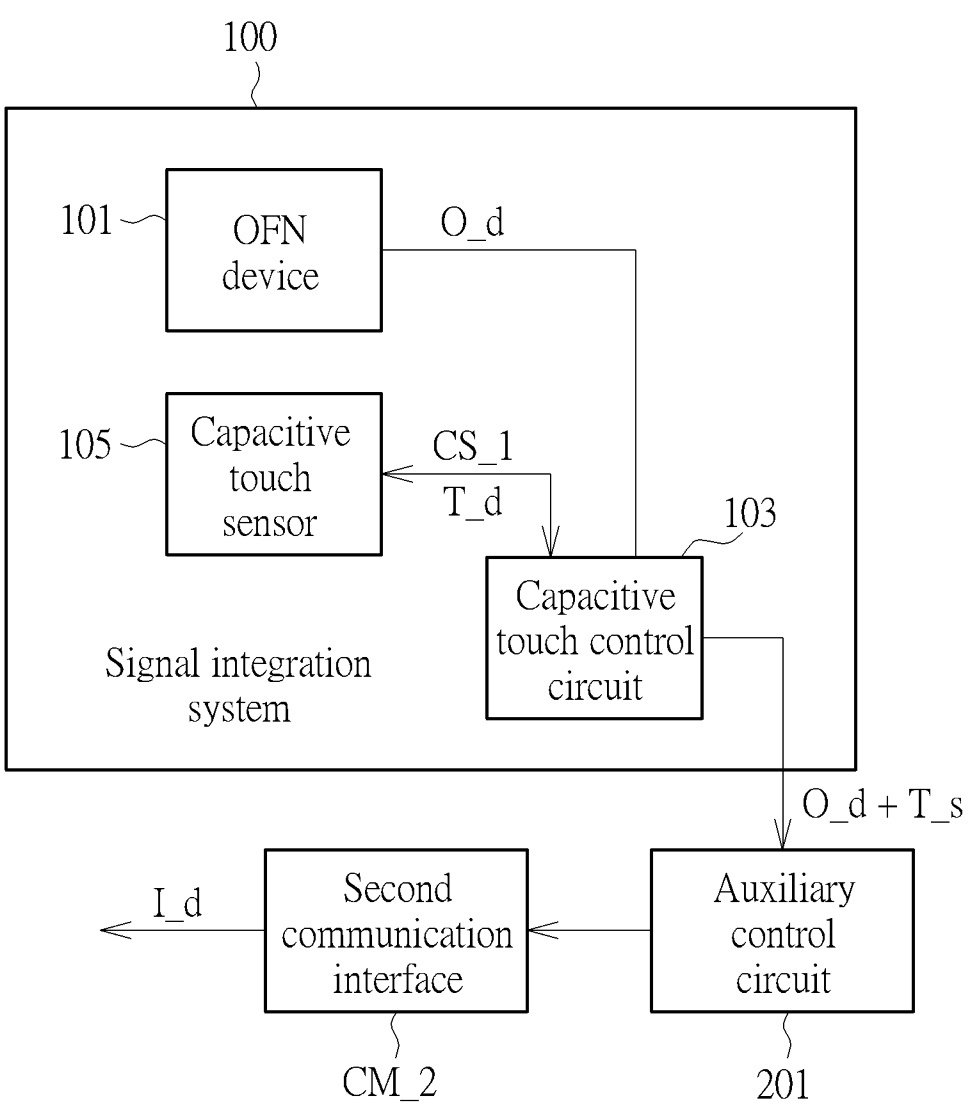

FIG. 1 and FIG. 2 are block diagrams illustrating that the signal integration system provided by the present invention is connected to other electronic devices in a car via different mechanisms. As shown in FIG. 1, the signal integration system 100 comprises an OFN device 101 and a capacitive touch control circuit 103. The OFN device 101 is configured to sense images of a finger to generate OFN sensing data O_d. The capacitive touch control circuit 103 is configured to receive the OFN sensing data O_d, and configured to generate first control signals CS_1 for a capacitive touch sensor 105, and is configured to receive touch sensing data T_d from the capacitive touch sensor 105. The capacitive touch control circuit 103 integrates the OFN sensing data O_d and a touch sensing result T_s corresponding to the touch sensing data T_d to output integrated data I_d.

In one embodiment, the OFN device is an optical navigation device (e.g., an optical touch control device), a heart rate detection device, or a fingerprint sensing device. Correspondingly, the OFN sensing data O_d can be a navigation result corresponding to the optical navigation device, a heart rate detection result corresponding to the heart rate detection device or a fingerprint. In one embodiment, the OFN device 101 is the fingerprint sensing device and is configured to encrypt the fingerprint to generate an encrypted fingerprint. In such case, the capacitive touch control circuit 103 can decrypt the encrypted fingerprint and transmits the decrypted fingerprint to another electronic device in the car. By this way, the car using the signal integration system 100 can provide an anti-theft mechanism to prevent the user's fingerprints from being recorded and stolen.

In one embodiment, the touch sensing data T_d from the capacitive touch sensor 105 means data which are not determined yet. For example, capacitive touch sensor 105 may output capacitance values which vary corresponding to if a finger touches a touch control device (e.g., a touch screen) comprising the capacitive touch sensor 105. In such case, the capacitive touch control circuit 103 generates the touch sensing result T_s according to the touch sensing data T_d. For example, the touch sensing result T_s can be a signal which may have a logic value 1 or a logic value 0. The logic value 1 means a finger touches the touch control device and the logic value 0 means no finger touches the touch control device.

In another embodiment, the touch sensing data T_d from the capacitive touch sensor 105 means data which are already determined. For example, capacitance values of the capacitive touch sensor 105 vary corresponding to if a finger touches the touch control device. In such case, the capacitive touch sensor 105 itself determines if a finger touches the touch control device according to the capacitance values to generate the touch sensing result T_s. For example, the touch sensing result T_s can be a signal which may have a logic value 1 or a logic value 0. The logic value 1 means a finger touches the touch control device and the logic value 0 means no finger touches the touch control device. Therefore, in such case, the touch sensing data T_d itself is the touch sensing result T_s.

Please note, although the capacitive touch sensor 105 is located in the signal integration system 100, but the capacitive touch sensor 105 can be a device independent from the signal integration system 100. If the signal integration system 100 comprises the capacitive touch sensor 105, the signal integration system 100 can be regarded as a capacitive touch control device. In such case, the capacitive touch control circuit 103 can be replaced by a control circuit, which may have the function of the capacitive touch control circuit 103 and may further comprises other functions.

As above-mentioned, the capacitive touch control circuit 103 integrates the OFN sensing data O_d and a touch sensing result T_s corresponding to the touch sensing data T_d to output integrated data I_d. The term "integrate" mentioned here can mean the capacitive touch control circuit 103 simultaneously or non-simultaneously transmit the OFN sensing data O_d and the touch sensing result T_s. For example, the capacitive touch control circuit 103 can transmit the OFN sensing data O_d and the touch sensing result T_s following the TDM (Time-Division Multiplexing) standard, to generate integrated data I_d. For another example, the capacitive touch control circuit 103 can transmit the OFN sensing data O_d and the touch sensing result T_s following the FDM (frequency-division multiplexing) standard, to generate integrated data I_d. However, the capacitive touch control circuit 103 can follow any other data transmission standard to integrate the OFN sensing data O_d and the touch sensing result T_s, rather than limited to TDM and FDM.

The capacitive touch control circuit 103 can be connected to other electronic devices in the car via various structures. For example, in the embodiment of FIG. 1, the touch control circuit 103 is connected to other electronic devices via a first communication device CM_1. The first communication device CM_1 corresponds to where the signal integration system 100 is provided. For example, the signal integration system 100 is provided in a car, and the first communication device CM_1 can be LIN (Local Interconnect Network) or CAN (Controller Area Network).

In the embodiment of FIG. 2, the first communication device CM_1 is removed and the capacitive touch control circuit 103 is connected to an auxiliary control circuit 201 which is connected to other electronic devices of the car via a second communication interface CM_2. In one embodiment, the auxiliary control circuit 201 is an ECU Bridge. Also, the second communication interface CM_2 can be the above-mentioned LIN or CAN. In such embodiment, if the OFN device 101 is a fingerprint sensing device which encrypts a fingerprint to generate an encrypted fingerprint, the decryption of the encrypted fingerprint can be performed by the auxiliary control circuit 201 rather than the capacitive touch control circuit 103.

Figure 3:
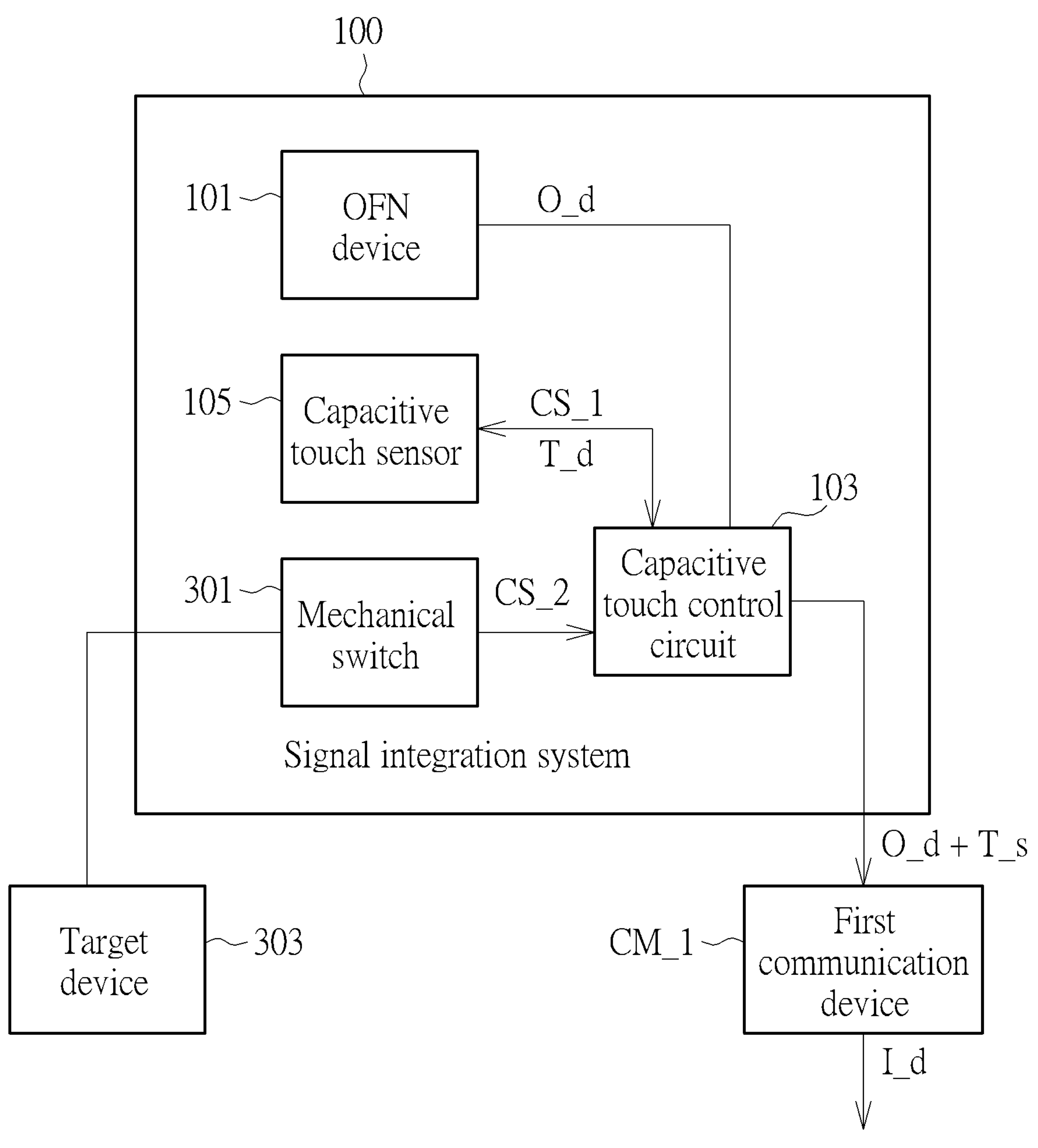
FIG. 3 is a block diagram illustrating that the capacitive touch control circuit is coupled to another electronic device.

The capacitive touch control circuit 103 can be coupled to another electronic device besides the above-mentioned OFN device 101 and the capacitive touch sensor 105. FIG. 3 is a block diagram illustrating that the capacitive touch control circuit 103 is coupled to another electronic device. In the embodiment of FIG. 3, the capacitive touch control circuit 103 is further connected to a mechanical switch 301 and receives a second control signal CS 2 from the mechanical switch 301. The mechanical switch 301 is used to control a target device 303 to turn on and turn off. Details of the mechanical switch 301 and the target device 303 will be described in following descriptions. Please note, the mechanical switch 301 can be provided in the signal integration system 100, but can be provided outside the signal integration system 100 and be independent from the signal integration system 100.

Figure 4:
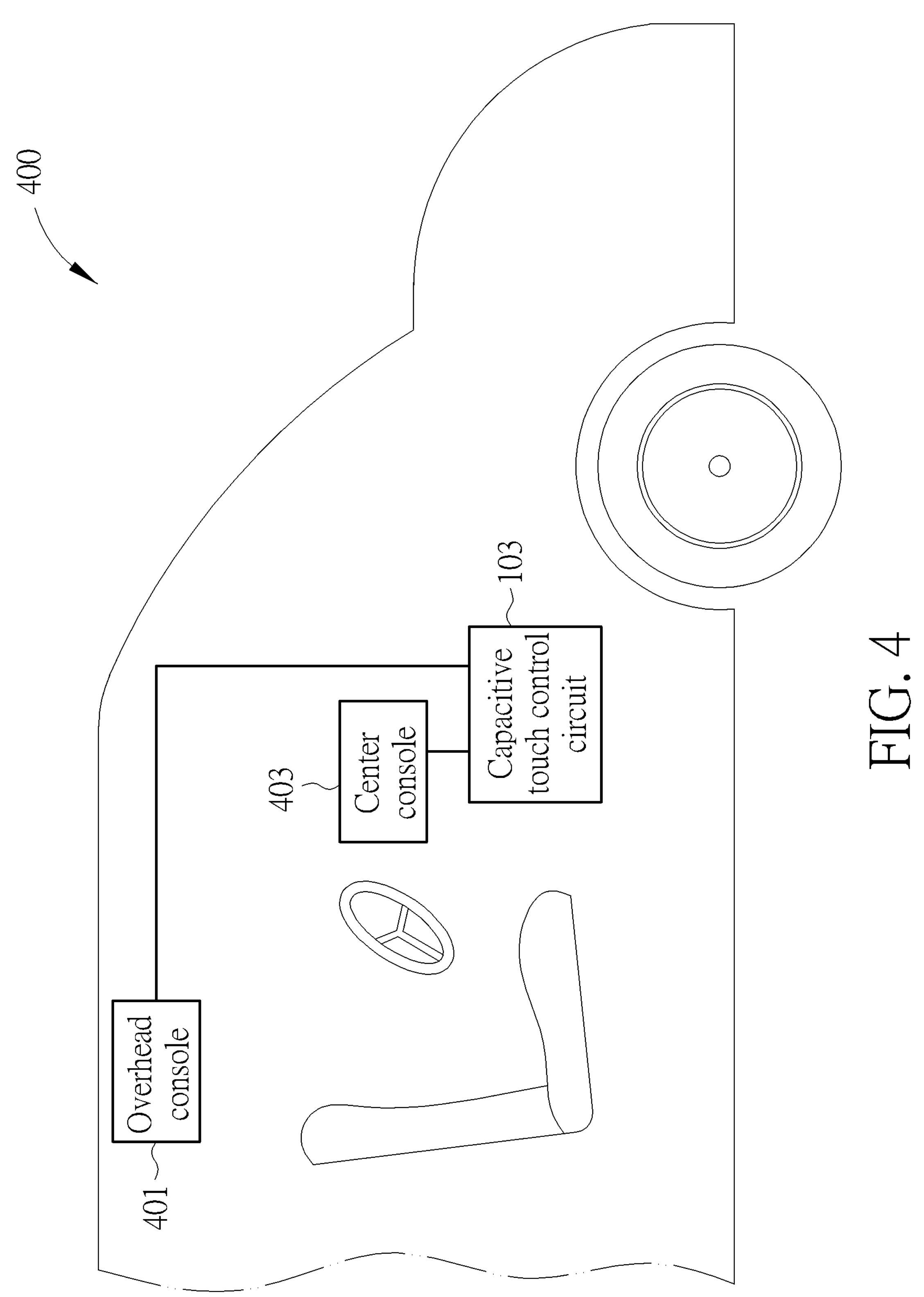
FIG. 4 is a schematic diagram illustrating a car which comprises a signal integration system, according to one embodiment of the present invention.
Figure 5:
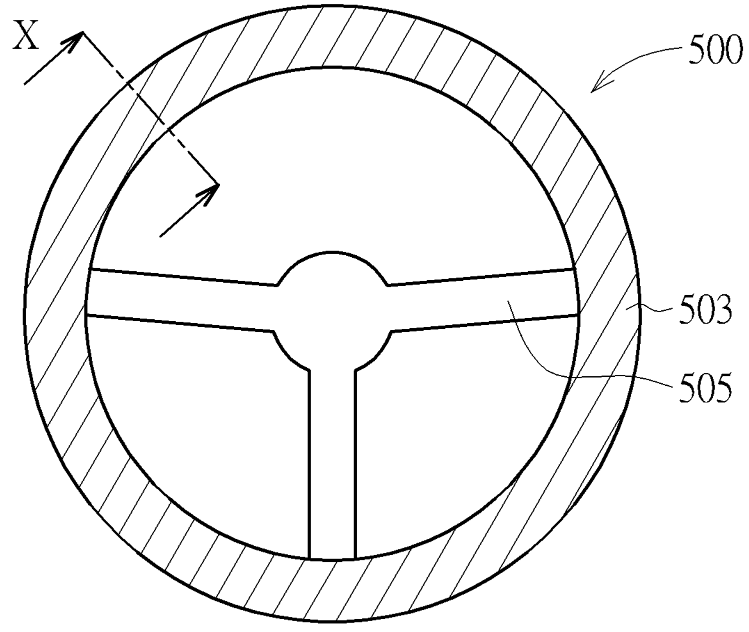
FIG. 5 is a schematic diagram illustrating that the capacitive touch sensor of the signal integration system is contained in a steering wheel, according to one embodiment of the present invention.
Figure 5:
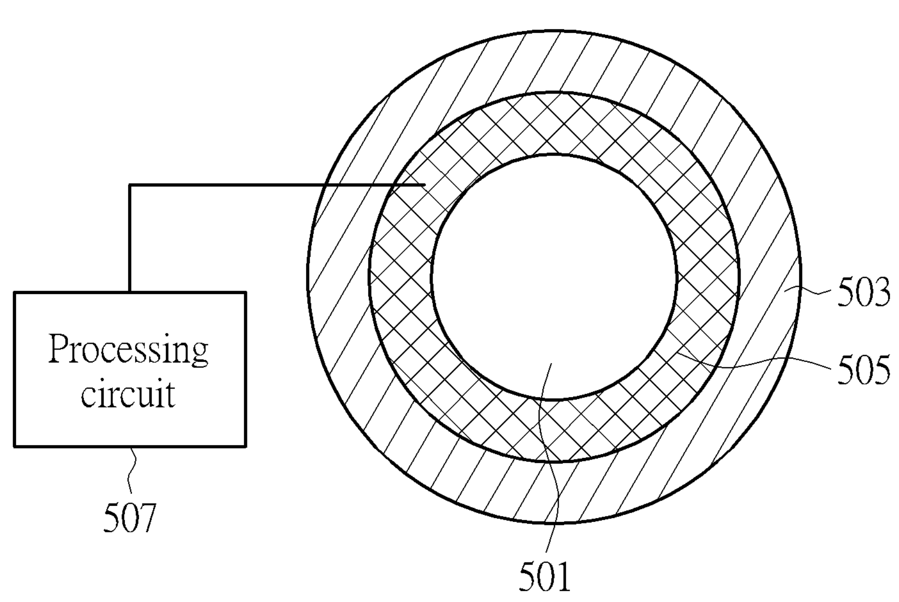

FIG. 4 and FIG. 5 are examples of practical applications of the signal integration system provided by the present invention. FIG. 4 is a schematic diagram illustrating a car which comprises a signal integration system, according to one embodiment of the present invention. As shown in FIG. 4, the signal integration system 100 is provided in a car 400, and the capacitive touch control circuit 103 is coupled to an overhead console 401 and a center console 403, which are the above-mentioned target devices 303 comprising the above-mentioned mechanical switches 301. The overhead console 401, for example, can be used for controlling a car sunroof or inner light of the car 400. The center console 403, for example, can be used for controlling an air-conditioning system or an audio system of the car 400. However, the target device 303 and the mechanical switch 303 are not limited to these examples.

FIG. 5 is a schematic diagram illustrating that the capacitive touch sensor of the signal integration system is contained in a steering wheel, according to one embodiment of the present invention. In the embodiment of FIG. 5, the steering wheel 500 is a component of a HOD (Hand Off Detection) device which comprises the steering wheel 500 and a processing circuit 507. The processing circuit 507 can be the above-mentioned capacitive touch control circuit 103.

In the upper diagram in FIG. 5, the steering wheel 500 comprises a frame work 501 and covering material 503. The lower diagram in FIG. 5 is a cross sectional diagram of the upper diagram in FIG. 5 following the X direction. As illustrated in the cross sectional diagram, a flexible capacitive touch sensing device 505 (the capacitive touch sensor 105) is provided between the covering material 503 and the frame work 501. The covering material 503 can be leather, wood, carbon fiber or any other required material.

The flexible capacitive touch sensing device 505 outputs a first capacitance if a distance of a user's hand and the flexible capacitive touch sensing device 505 is larger than a predetermined distance, and outputs a second capacitance if a distance of a user's hand and the flexible capacitive touch sensing device 505 is smaller than the predetermined distance. In one embodiment, the predetermined distance is set as 0, therefore the flexible capacitive touch sensing device 505 outputs the first capacitance if the user's hand does not touch the steering wheel 500, and outputs a second capacitance if the user hand touches the steering wheel 500. Therefore, the processing circuit 507 can determine whether the user touches the steering wheel 500 or not according to the capacitance output by the flexible capacitive touch sensing device 505.

Figure 6:
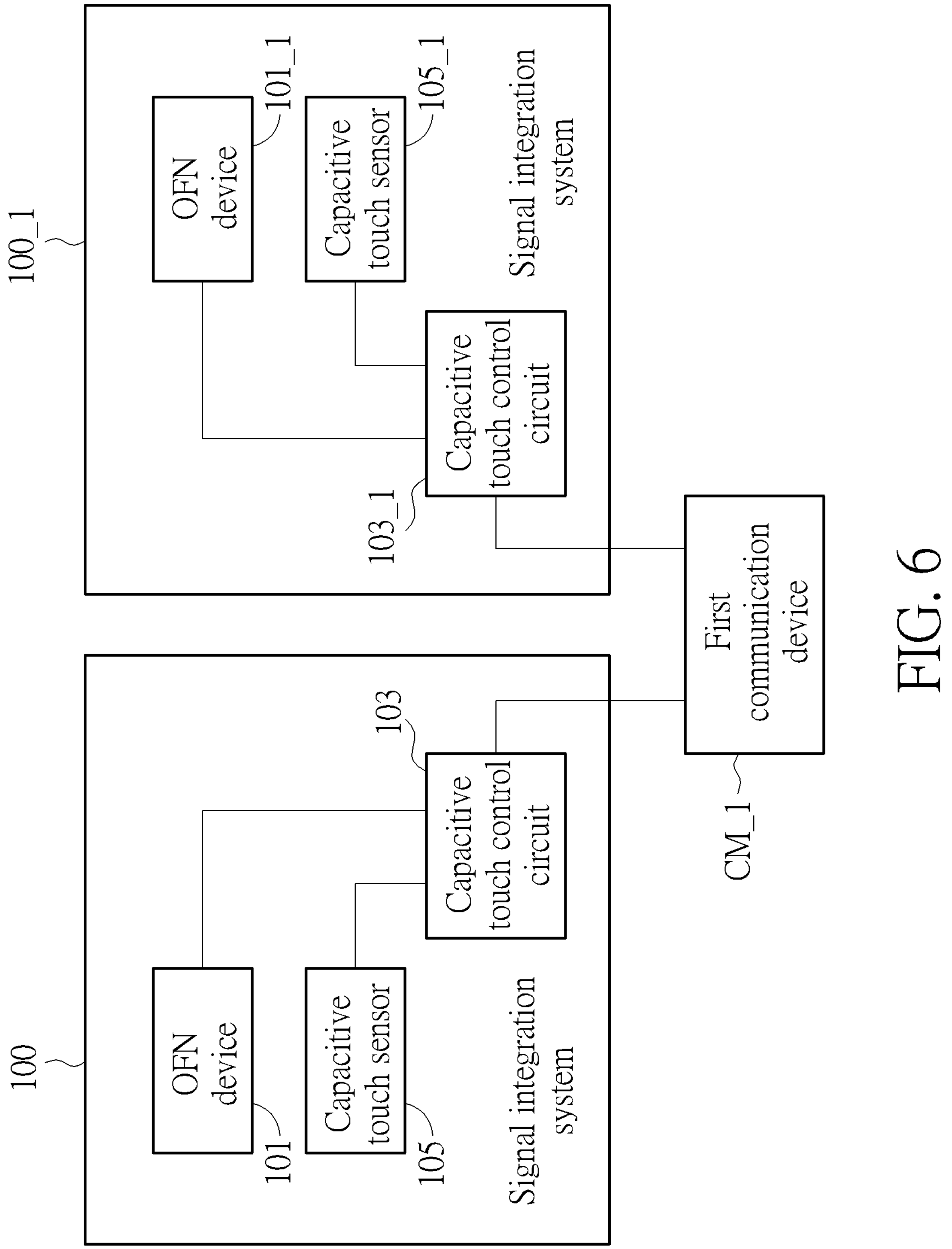
FIG. 6 and FIG. 7 are block diagrams illustrating that more than one signal integration systems are provided, according to embodiments of the present invention.
Figure 7:
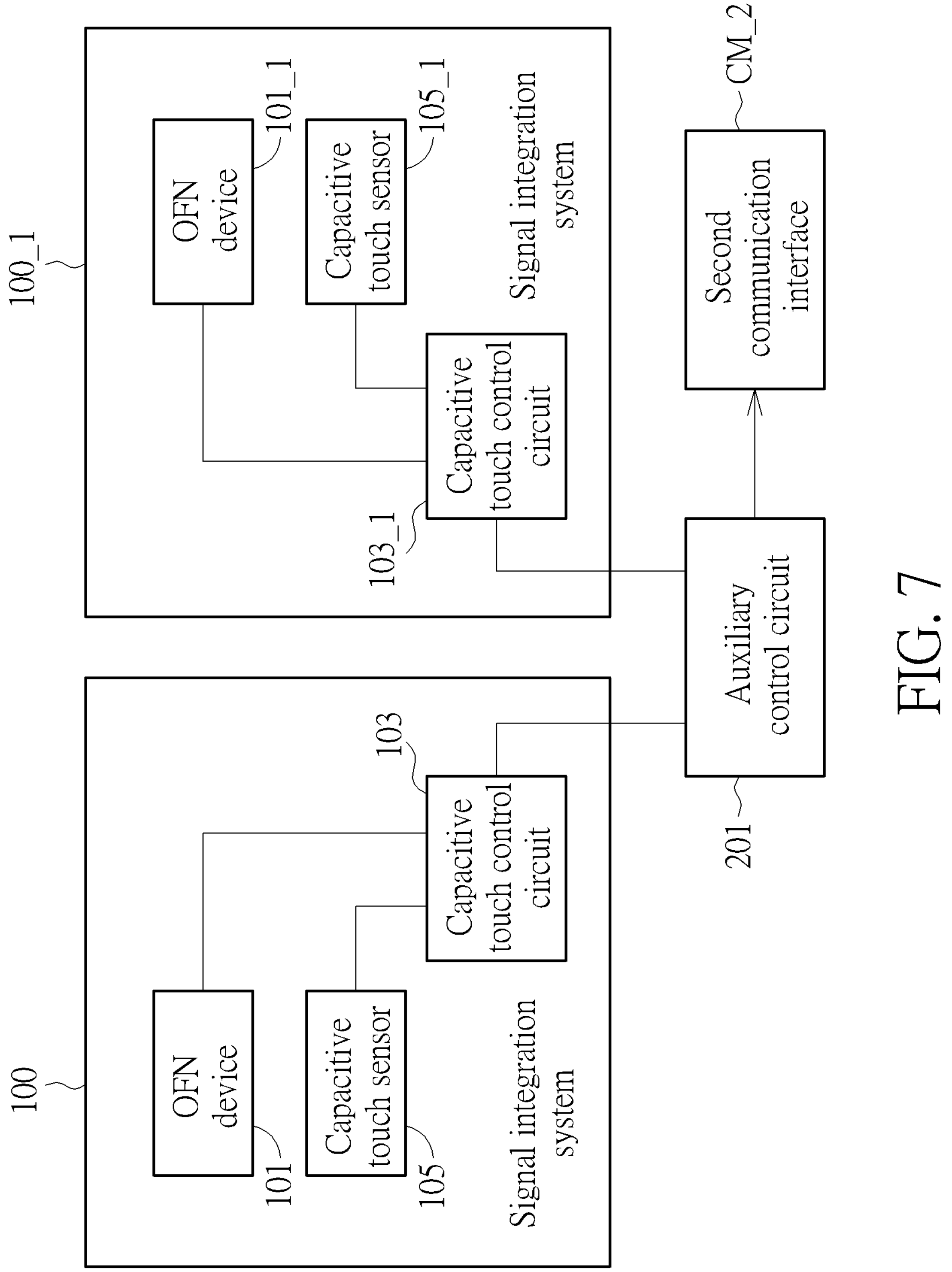

In the above-mentioned embodiments, only one signal integration system is provided. However, more than one signal integration systems can be provided in a single car. FIG. 6 and FIG. 7 are block diagrams illustrating that more than one signal integration systems are provided, according to embodiments of the present invention. In the embodiment of FIG. 6, two signal integration systems 100, 100_1 are provided. The same as the signal integration systems 100, the signal integration systems 100_1 also comprises an OFN device 101_1, a capacitive touch control circuit 103_1 and a capacitive touch sensor 105_1. The capacitive touch control circuit 103 and the capacitive touch control circuit 103_1 are both connected to the first communication device CM_1. Operations of the signal integration systems 100_1 are the same as the operations of the signal integration systems 100 illustrated in FIG. 1, thus are omitted for brevity here.

In the embodiment of FIG. 7, two signal integration systems 100, 100_1 are provided. The same as the signal integration systems 100, the signal integration systems 100_1 also comprises an OFN device 101_1, a capacitive touch control circuit 103_1 and a capacitive touch sensor 105_1. The capacitive touch control circuit 103 and the capacitive touch control circuit 103_1 are both connected to the auxiliary control circuit 201 which is connected to the second communication device CM_2. Operations of the signal integration systems 100_1 are the same as the operations of the signal integration systems 100 illustrated in FIG. 2, thus are omitted for brevity here.

In one embodiment, the embodiments illustrated in FIG. 6, FIG. 7 are applied to the steering wheel 500 illustrated in FIG. 5. In such case, the capacitive touch sensors 105, 105_1 are provided in different portions of the steering wheel 500. For example, the capacitive touch sensors 105 is provided in a left portion of the steering wheel 500 and the capacitive touch sensor 105_1 is provided in a right portion of the steering wheel 500. By this way, the HOD detection can be more accurate, since different capacitive touch sensors and capacitive touch control circuits are responsible for hand detections in different portions of steering wheels.

In view of above-mentioned embodiments, the electronic devices following different standards can be easily integrated by the signal integration system. By this way, the complexity for designing the whole system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal integration system, comprising:

an optical finger navigation (OFN) device, configured to sense images of a finger to generate OFN sensing data; and a capacitive touch control circuit, configured to receive the OFN sensing data, configured to generate first control signals for a capacitive touch sensor, and configured to receive touch sensing data from the capacitive touch sensor;

wherein the capacitive touch control circuit integrates the OFN sensing data and a touch sensing result corresponding to the touch sensing data to output integrated data;

wherein the OFN device is a fingerprint sensing device and is configured to encrypt the fingerprint to generate an encrypted fingerprint;

wherein the capacitive touch control circuit is connected to an auxiliary control circuit which decrypts the encrypted fingerprint;

wherein the signal integration system is in a conveyance, wherein the auxiliary control circuit is connected to other electronic devices of the conveyance via a second communication interface.

2. The signal integration system of claim 1, wherein the capacitive touch control circuit is further connected to a mechanical switch to receive a second control signal from the mechanical switch, wherein the mechanical switch is used to control a target device to turn on and turn off.

3. The signal integration system of claim 2, wherein the target device is an overhead console or a center console of the conveyance.

4. The signal integration system of claim 1, wherein the capacitive touch control circuit is connected to the conveyance via a first communication interface.

5. The signal integration system of claim 1, wherein the signal integration system is provided in a steering wheel of the conveyance.

6. The signal integration system of claim 5, wherein the steering wheel comprises a hand off detection device, wherein the capacitive touch sensor is used for a hand off detection device.

7. A capacitive touch control device, comprising:

a capacitive touch sensor;

an optical finger navigation (OFN) device, configure to sense images of a finger to generate OFN sensing data; and a control circuit, configured to receive the OFN sensing data, configured to generate first control signals for the capacitive touch sensor, and configured to receive touch sensing data from the capacitive touch sensor;

wherein the control circuit integrates the OFN sensing data and a touch sensing result corresponding to the touch sensing data to output integrated data;

wherein the control circuit is further connected to a mechanical switch to receive a second control signal from the mechanical switch, wherein the mechanical switch is used to control a target device to turn on and turn off;

wherein the OFN device is a fingerprint sensing device configured to encrypt the fingerprint to generate an encrypted fingerprint;

wherein the control circuit is connected to an auxiliary control circuit which decrypts the encrypted fingerprint.

8. The capacitive touch control device of claim 7, wherein the capacitive touch control device is in a conveyance, and the target device is an overhead console or a center console of the conveyance.

9. The capacitive touch control device of claim 7, wherein the capacitive touch control device is in a conveyance, wherein the control circuit is connected to other electronic devices of the conveyance via a first communication interface.

10. The capacitive touch control device of claim 7, wherein the capacitive touch control device is in a conveyance, wherein the auxiliary control circuit is connected to other electronic devices of the conveyance via a second communication interface.

11. The capacitive touch control device of claim 7, wherein the capacitive touch control device is provided in a steering wheel of a conveyance.

12. The capacitive touch control device of claim 11, wherein the steering wheel comprises a hand off detection device, wherein the capacitive touch sensor is used for a hand off detection device.

* * * * *